(12) United States Patent
Tran

(10) Patent No.: US 11,614,004 B2
(45) Date of Patent: Mar. 28, 2023

(54) VARIABLE TIMING VALVE APPARATUS

(71) Applicant: Jay Tran, Fountain Valley, CA (US)

(72) Inventor: Jay Tran, Fountain Valley, CA (US)

( * ) Notice: Subject to any disclaimer, the term of this patent is extended or adjusted under 35 U.S.C. 154(b) by 0 days.

(21) Appl. No.: 17/444,653

(22) Filed: Aug. 6, 2021

(65) Prior Publication Data

US 2023/0040266 A1 Feb. 9, 2023

(51) Int. Cl.
*F01L 1/344* (2006.01)
*F01L 1/047* (2006.01)

(52) U.S. Cl.
CPC .............. *F01L 1/344* (2013.01); *F01L 1/047* (2013.01)

(58) Field of Classification Search
None
See application file for complete search history.

(56) References Cited

U.S. PATENT DOCUMENTS

| | | | | |
|---|---|---|---|---|
| 4,463,712 A * | 8/1984 | Stojek | ............... | F01L 1/34403 |
| | | | | 123/90.31 |
| 4,561,390 A * | 12/1985 | Nakamura | .......... | F01L 1/34406 |
| | | | | 123/90.15 |
| 4,976,229 A * | 12/1990 | Charles | ............... | F01L 1/34406 |
| | | | | 123/90.17 |
| 5,219,313 A * | 6/1993 | Danieli | ............... | F01L 1/34406 |
| | | | | 123/90.17 |
| 5,337,627 A * | 8/1994 | Nakamura | .......... | F16H 25/2204 |
| | | | | 74/424.76 |
| 5,355,849 A * | 10/1994 | Schiattino | ................. | F01L 1/34 |
| | | | | 123/90.31 |
| 5,803,030 A * | 9/1998 | Cole | ........................ | F01L 1/344 |
| | | | | 123/90.31 |
| 6,167,854 B1 * | 1/2001 | Regueiro | ................ | F01L 1/344 |
| | | | | 123/90.17 |
| 6,199,522 B1 * | 3/2001 | Regueiro | ................ | F01L 1/344 |
| | | | | 123/90.15 |
| 6,202,611 B1 * | 3/2001 | Regueiro | ............ | F01L 1/34403 |
| | | | | 123/90.31 |
| 6,213,071 B1 * | 4/2001 | Lancefield | .......... | F01L 1/34406 |
| | | | | 123/90.31 |
| 6,216,654 B1 * | 4/2001 | Regueiro | ............ | F01L 1/34406 |
| | | | | 123/90.15 |
| 8,001,938 B2 * | 8/2011 | Kameda | .............. | F01L 1/34403 |
| | | | | 123/90.17 |
| 2008/0163836 A1 * | 7/2008 | Taye | .................... | F01L 1/34406 |
| | | | | 123/90.15 |

FOREIGN PATENT DOCUMENTS

WO WO-2008041282 A1 * 4/2008 .............. F01L 1/022

\* cited by examiner

*Primary Examiner* — Devon C Kramer
*Assistant Examiner* — Wesley G Harris
(74) *Attorney, Agent, or Firm* — Shimokaji IP

(57) ABSTRACT

A variable valve timing assembly includes an electric motor; a first set of gears driven by the electric motor; a first set of grooves and ball bearings driven by the first set of gears; a second set of grooves and ball bearings driven by the first of grooves and ball bearings; wherein the first set of grooves and ball bearings converts rotational movement of the first set of gears to axial rotational movement of the first set of ball bearings; wherein the axial movement of the first set of ball bearings causes rotational movement of the second set of grooves; whereby the rotational movement of the second set of grooves enables rotation of a camshaft engaged to a valve.

6 Claims, 5 Drawing Sheets

VARIABLE TIMING VALVE APPARATUS

BACKGROUND OF THE INVENTION

The present invention generally relates to timing of valves in a combustion engine and, more particularly, to apparatus and methods of advancing/retarding the timing of intake and/or exhaust valves.

Valves are used to control the intake and exhaust of gases, such as in combustion engines. The valves move to allow such intake and exhaust in a timed fashion. The timing of such movement can affect engine performance.

Different engine conditions can be affected by valve timing. Thus, engine performance can be optimized or improved by varying the timing for opening and/or closing of the intake and/or exhaust valves. The timing, for example, may be advanced or retarded.

Varying the timing of valves has been attempted by various systems. One such system is a hydraulic system that utilizes pressurized oil. However, a pressurized oil system is subject to leakage and backflow, which results in decreased effectiveness.

As can be seen, there is a need for improved apparatus and methods to vary valve timing.

SUMMARY OF THE INVENTION

In one aspect of the present invention, a variable valve timing assembly comprises an electric motor; a first set of gears driven by the electric motor; a first set of grooves and ball bearings driven by the first set of gears; a second set of grooves and ball bearings driven by the first of grooves and ball bearings; wherein the first set of grooves and ball bearings converts rotational movement of the first set of gears to axial movement of the first set of ball bearings; wherein the axial movement of the first set of ball bearings causes rotational movement of the second set of grooves; whereby the rotational movement of the second set of grooves enables rotation of a camshaft engaged to a valve.

In another aspect of the present invention, a variable valve timing assembly comprises an electric motor; a worm drive driven by the electric motor; a compression gear driven by the worm drive; a ball screw driven by the compression gear, wherein the ball screw converts rotational movement of the compression gear to axial movement of the ball screw; a set of grooves and ball bearings that are operatively connected to the ball screw; wherein the set of grooves and ball bearings is configured to convert axial movement of the ball screw to rotational movement of a camshaft connected to a valve.

In a further aspect of the present invention, a variable valve timing assembly comprises an electric motor; a first set of gears driven by the electric motor; a first set of grooves and ball bearings driven by the first set of gears; a timing helix driven by the first set of grooves and ball bearings, wherein the timing helix includes a second set of grooves; a timing gear driven by the timing helix, wherein the timing gear includes a second set of ball bearings; whereby the timing helix and the timing gear are configured to convert axial movement of the first set of grooves and ball bearings to rotational movement of a camshaft connected to a valve.

These and other features, aspects and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but it is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The technical problems to be solved is that a variable valve timing system can be inefficient; can allow for only relatively large, stepped changes in timing; and can be subject to unintended reversal of such changes.

Broadly, the present invention solves the foregoing problems by providing a variable valve timing system that includes electrically motor driven gears that can convert rotational movement to axial movement of a set of grooves and ball bearings. The axial movement is converted to continuous (as opposed to stepped) rotational movement of a camshaft, wherein the rotational movement can be clockwise or counterclockwise. The rotational movement of the camshaft can be used to advance or retard the timing of intake or exhaust valves. The present invention can essentially eliminate the unintentional reversal of the camshaft rotation by a self-locking worm drive.

Figure 1:
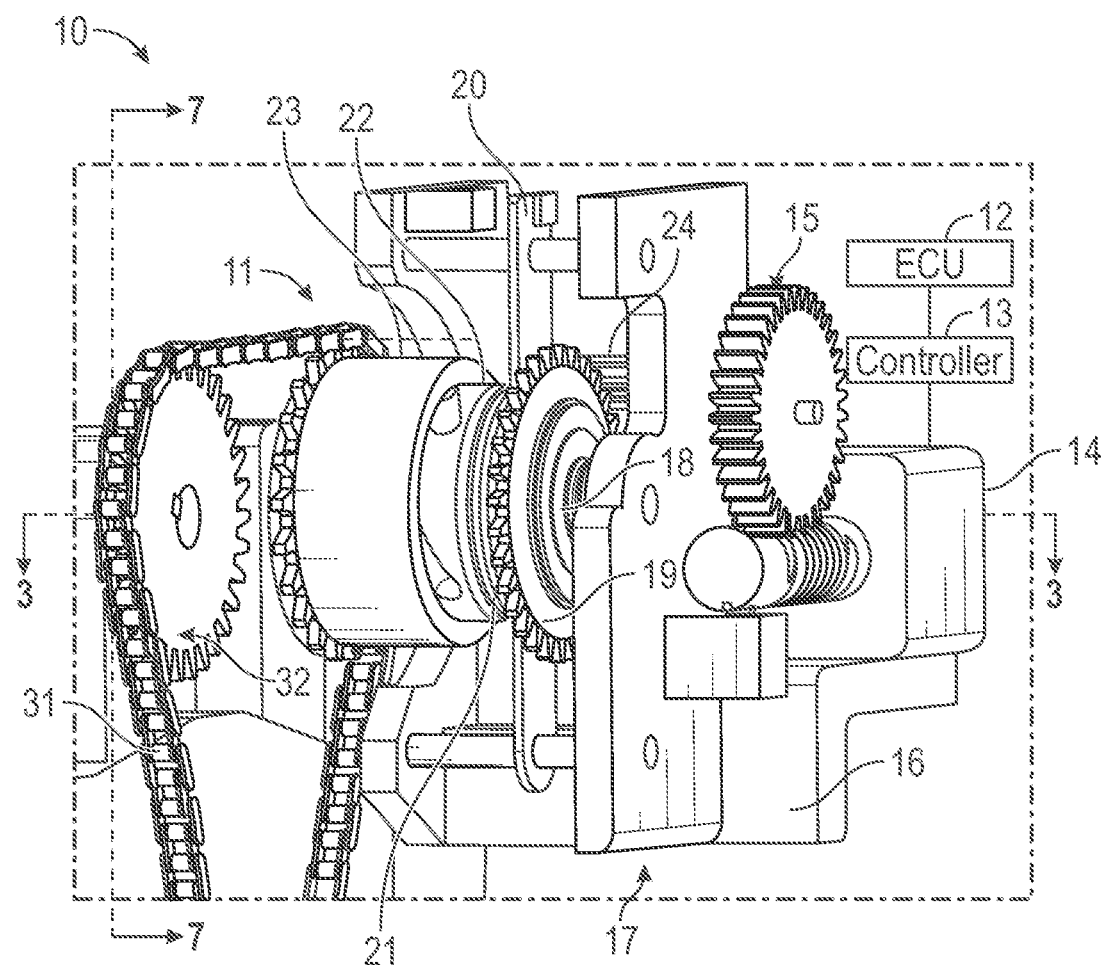
FIG. 1 is a perspective view of an exemplary embodiment of a system of the present invention.

In FIG. 1, a system 10 according to an embodiment of the present invention is shown. The system may include a variable valve timing assembly 11, an electronic control unit (ECU) 12, and a controller 13 in communication with the timing assembly 11 and the ECU 12.

In embodiments, the ECU 12 may be an existing component of a vehicle having a combustion engine. Accordingly, the ECU 12 may be configured to receive information from sensors associated with the engine. In embodiments, the controller 13 may include a processor(s) and a look-up table(s) having engine performance data and valve timing data. The controller 13 may use signals from the ECU to determine a valve timing variance to be implemented and then send control signals to the timing assembly 11.

In FIG. 1, according to embodiments, the variable valve timing assembly 11 may include an electric motor 14 in communication with the controller 13.

Figure 2:
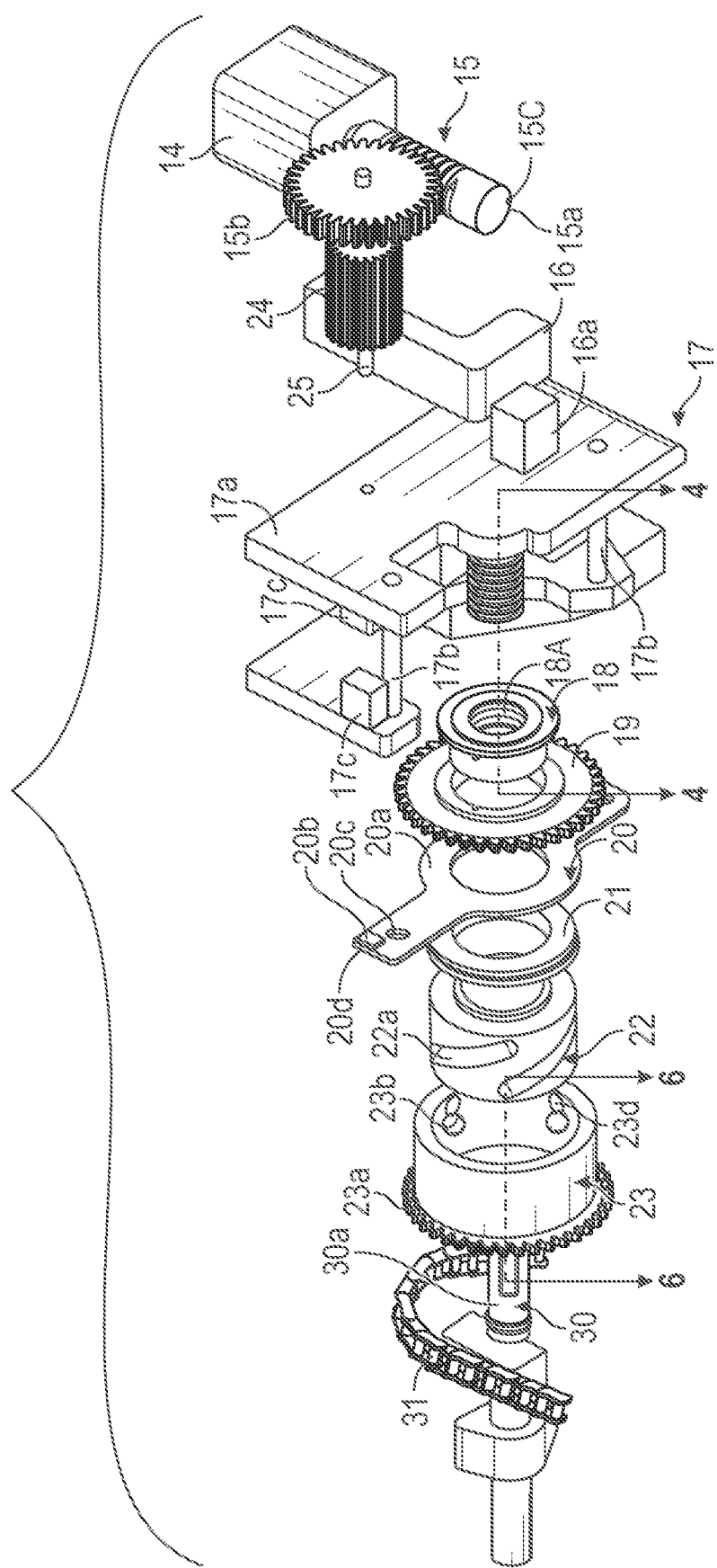
FIG. 2 is an exploded, perspective view of an exemplary embodiment of an assembly of the present invention.
Figure 3:
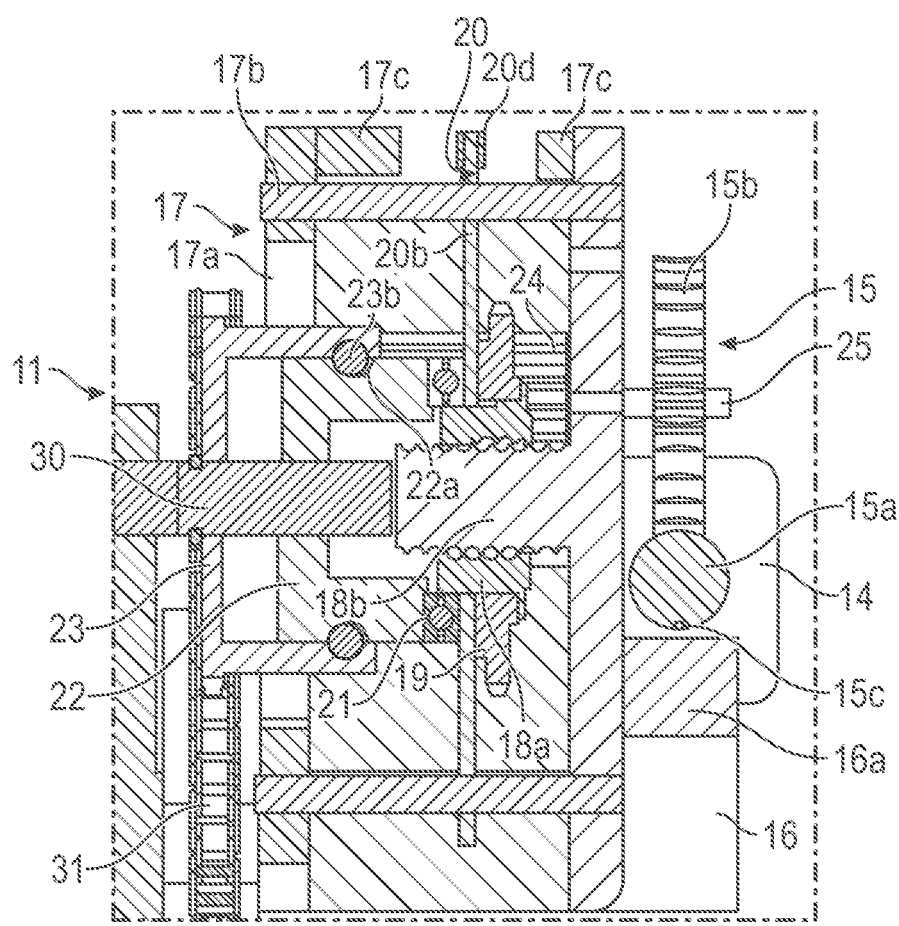
FIG. 3 is a cross-sectional view of the exemplary embodiment of the present invention taken along line 3-3 of FIG. 1.

In FIGS. 2-3, according to embodiments, the electric motor 14 may be supported on a platform 16 and may have a magnetic rotation counter sensor 16a thereon, the purpose of which is further described below. The electric motor 14 may drive a first set of gears which may include a worm drive 15 and a compression gear 19.

In embodiments, the worm drive 15 may include a worm screw 15a driven by the electric motor 14 and may also include a worm wheel 15b driven by the worm screw 15a. The worm screw 15a and the worm wheel 15b may rotate in a clockwise or counterclockwise direction, depending on whether the electric motor 14 has been controlled to advance or retard valve timing.

According to embodiments, the worm drive 15 may be self-locking. In other words, when the worm screw 15a and the worm wheel 15b are intentionally rotated in an intended direction, subsequent unintentional rotation in an opposite direction is prevented or minimized. This can be achieved by virtue of a large reduction ratio between the worm screw 15a and the worm wheel 15b, and/or by a large amount of friction between a low lead angle of the gear teeth of the worm screw 15a and the gear teeth of the worm wheel 15b.

In embodiments, a reduction ratio between the worm screw 15a and the worm wheel 15b may be about 30:1 or higher. In embodiments, a lead angle of the worm screw 15 may be about 5 degrees or less. In embodiments, a coefficient of friction between the gear teeth of the worm screw 15a and the gear teeth of the worm wheel 15b may be about 0.09 or higher.

Still referring to FIGS. 2-3, in embodiments, a magnetic strip 15c may be on a distal end of the worm screw 15a which is opposite the electric motor 14. The magnetic strip 15c may be read by the magnetic rotation counter sensor 16a as the worm screw 15a rotates. The counted rotations of the worm screw 15a may be used by the controller 13 to measure the electric motor 14 rotational speed and number of rotations which can, in turn, be used by the controller 13 to further alter operation of the electric motor 14.

As the worm wheel 15b rotates, a shaft 25 may rotate which, in turn, can rotate a spur gear 24 in a clockwise or counterclockwise direction. In embodiments, rotation of the spur gear 24 may drive rotation of a compression gear 19.

In FIG. 3, according to embodiments, the compression gear 19 may encircle and connect to a ball screw 18. In embodiments, the compression gear 19 may be rotationally connected to the ball screw 18 via a slot in the compression gear 19 and a tab on the ball screw 18, as an example. In embodiments, the compression gear 19 may be axially connected to the ball screw 18 via respective internal and external surface contact (i.e., physically touching each other and axial force transfer).

Figure 4:
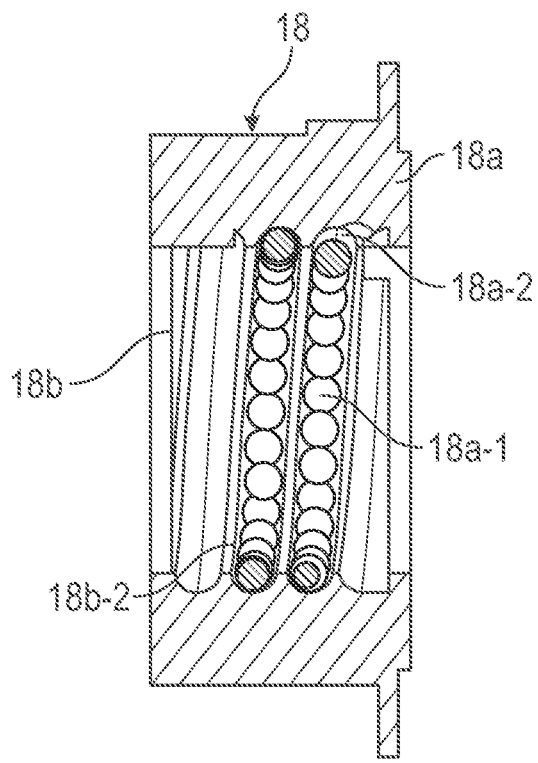
FIG. 4 is a cross-sectional view of the exemplary embodiment of a ball screw of the present invention taken along line 4-4 of FIG. 2.

In embodiments, the ball screw 18 can include a ball assembly 18a that is encircled by and that extends through the compression gear 19 (FIG. 3). The ball assembly 18a can have a plurality or set of ball bearings 18a-1 and grooves 18a-2 (FIG. 4). In embodiments, the ball screw 18 may further include a threaded shaft 18b that is encircled by and that extends through the ball assembly 18a, as well as through the compression gear 19 (FIG. 3). The threaded shaft 18b can have a plurality or set of helical grooves 18b-2 which can engage the set of ball bearings 18a-1 in the ball assembly 18a (FIG. 4).

In embodiments, rotation of the compression gear 19 may drive rotation of the ball assembly 18a about the threaded shaft 18b. Depending on the direction of rotation by the worm screw 15a, and hence the direction of rotation by the compression gear 19, the ball assembly 18a may rotate clockwise or counterclockwise. In turn, according to embodiments, rotation of the ball assembly 18a may cause the ball assembly 18a, and thereby the compression gear 19, to move axially along the threaded shaft 18b. The ball assembly 18a, with the compression gear 19, may move axially towards or away from the electric motor 14, depending on the direction of rotation of the ball assembly 18a.

In FIG. 3, according to embodiments, the threaded shaft 18b may be supported by and within a housing 17. Thereby, the ball screw 18 and the compression gear 19 may be positioned within the housing 17.

The housing 17 may include a pair of side walls 17a which support a pair of upper and lower shafts 17b therebetween, in embodiments. The side walls 17a may also support therebetween a pair of magnetic sensors 17c, the purpose of which is further described below.

In FIGS. 2-3, in embodiments, an anti-torsion plate 20 may be disposed within the housing 17. The anti-torsion plate 20 may directly interface and contact a side of the compression gear 19 away from the electric motor 14, and thereby prevent or minimize torsion by the compression gear 19 and/or the ball assembly 18a.

In embodiments, the anti-torsion plate 20 may include a donut-shaped main body 20a that encircles and axially connects to the ball assembly 18a therein—via respective internal and external surface contact (i.e., physically touching each other and axial force transfer). A pair of opposing arms 20b, such as about 180 degrees apart, may be on the main body 20a.

The anti-torsion plate 20 may, in embodiments, include an aperture 20c disposed at each distal end of the arms 20b. The apertures 20c may be configured to receive and axially move in either direction along the upper and lower shafts 17b of the housing 17. The axial movement of the apertures 20c, and thus the entire anti-torsion plate 20, can coincide with the axial movement of the compression gear 19 and the ball screw 18.

A pair of magnetic strips 20d may be on opposite sides of one arm 20b at a distal end thereof, the purpose of which is to be read by the magnetic sensors 17c in the housing 17. In embodiments, reading by the sensors 17c can be of an axial distance traveled by the anti-torsion plate 20. The axial distance traveled by the anti-torsion plate 20 can be used by the controller 13 to determine an axial distance traveled by a timing helix 22 (described below) and thus determine a change in rotational movement of the camshaft 30, as further described below.

In FIGS. 2-3, according to embodiments, a thrust bearing 21 may be disposed within the housing 17. The thrust bearing 21 may directly interface and contact a side of the anti-torsion plate 20 opposite from the compression gear 19. The thrust bearing 21 may encircle the ball assembly 18a and allow the ball assembly 18a to rotate therein. The thrust bearing 21 may absorb axial loads from the ball assembly 18a, and/or a camshaft 30 described below, and/or a timing helix 22 described below.

Figure 7:
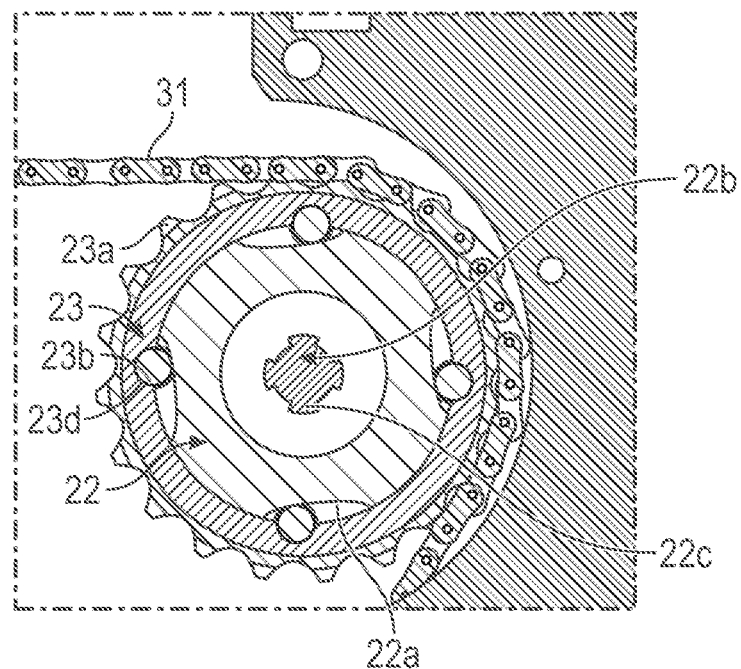
FIG. 7. is a cross-sectional view of the exemplary embodiment of the present invention taken along line 7-7 of FIG. 1.

Still referring to FIGS. 2-3, according to embodiments, a second set of grooves and ball bearings can include the timing helix 22 and a timing gear 23, both of which may be disposed within the housing 17. The timing helix 22 may directly interface and contact a side of the thrust bearing 20 opposite the anti-torsion plate 20. The timing gear 23 may encircle the timing helix 22 (FIGS. 3 and 7).

Figure 5:
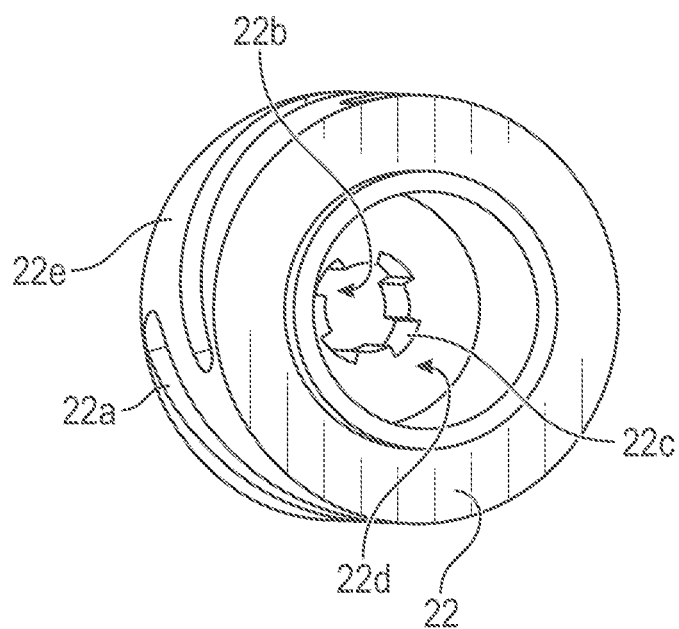
FIG. 5. is a perspective view of an exemplary embodiment of a timing helix according to the present invention.

In FIG. 3, according to embodiments, the timing helix 22 can be a cylindrical-shaped body that can receive, at opposite ends thereof, the camshaft 30 and the threaded shaft 18b of the ball screw 18. A plurality or set of second grooves 22a may extend about an exterior surface 22e of the timing helix 22, as shown in FIGS. 2 and 5. In embodiments, each of the grooves 22a may be curved in an axial direction.

In FIG. 5, according to embodiments, the timing helix 22 may also include an end wall 22d having therein an aperture 22b. The cross-section of the aperture 22b can be configured to match a cross-section of the camshaft 30, such as by slots 22c about the perimeter of the aperture 22b. Thereby, the camshaft 30 may extend into and be rotationally affixed to the timing helix 22.

In embodiments, the timing helix 22 can be axially connected to the thrust bearing 21 via respective external surface contact (FIG. 3).

Accordingly, in embodiments, the axial movement (in either direction) of the ball assembly 18a is transferred to the timing helix 22 via the compression gear 19, the anti-torsion plate 20, and the thrust bearing 21. The axial movement of the timing helix 22 can cause it to rotate by virtue of the interaction between the grooves 22a in the timing helix 22 and ball bearings 23b of the timing gear 23, as described below.

In FIGS. 1-3 and 6, according to embodiments, the timing gear 23 can be a cylindrical-shaped body that can receive, at opposite ends thereof, the camshaft 30 and the timing helix 22. The timing gear 23 may also include an end wall 23e having an aperture 23c therein. The aperture 23c may be configured to receive and rotationally connect the camshaft 30 therein.

Figure 6:
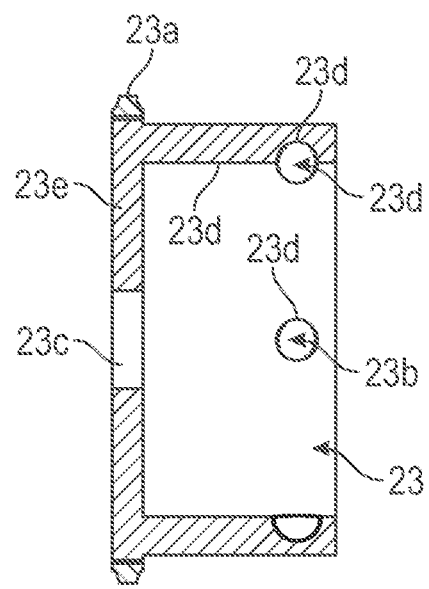
FIG. 6. is a cross-sectional view of the exemplary embodiment of the present invention taken along line 6-6 of FIG. 2.

In FIGS. 6-7, according to embodiments, on an interior surface 23d of the timing gear 23 can be a plurality of pockets 23d that may hold a plurality or second set of ball bearings 23b. The ball bearings 23b can be configured to move in the grooves 22a of the timing helix 22 as the timing helix 22 moves axially. As a result, the timing helix 22 can rotate in either direction, depending on the direction of its axial movement. And such rotation by the timing helix 22 can be transferred to the timing gear 23 and thereby to the camshaft 30 affixed in the timing gear 23. Thus, it can be appreciated that the first set of grooves (e.g., 18b-2) and ball bearings (e.g., 18a-1) can drive the second set of grooves (e.g., 22a) and ball bearings (e.g., 23b).

In embodiments, the timing gear 23 may also include a plurality of teeth 23a disposed outside of the housing 17. The teeth 23a may extend circumferentially about and at a distal end of the timing gear 23. The plurality of teeth 23a can be configured to match those of another timing gear 32 (FIG. 1), and it can also be configured to engage a timing chain (aka belt) 31 that can move with the rotation of the timing gears 23, 32 (FIG. 2).

In operation, according to embodiments, the ECU 12 may monitor engine conditions and then, based on those conditions, send a signal to the controller 13. The controller 13 may determine that the timing of the engine valves needs to be advanced or retarded. Based on that determination, the controller 13 may send a signal to the electric motor 14 to initiate rotation of the worm screw 15a, in either a clockwise or counterclockwise direction, depending on whether the valve timing is to be advanced or retarded. Rotation of the worm screw 15a can be counted by sensor 16a which may be used by the controller 13 to alter the operation of the electric motor 14.

The rotation of the worm screw 15a may be converted to rotation of the worm wheel 15b. In turn, the worm wheel 15b may drive, via the spur gear 24, rotation of the compression gear 19. Rotation of the compression gear 19 may then drive rotation of the ball assembly 18a about the threaded shaft 18b.

Rotation of the ball assembly 18a may cause the ball assembly 18a to move axially along the threaded shaft 18b. The direction of rotation of the ball assembly 18a can dictate in which direction the ball assembly 18a will axially move.

Axial movement of the ball screw 18 may cause a similar axial movement (in both amount and direction) by the compression gear 19, the anti-rotation plate 20 and the thrust bearing 21.

The above axial movement can then create an axial movement of the timing helix 22. As the timing helix 22 moves axially, the ball bearings 23b in the timing gear 23 can move along the grooves 22a in the timing helix 22. Such movement by the ball bearings 23b can then cause the timing helix 22 to rotate. The direction of rotation by the timing helix 22 can depend on the direction of axial movement by the timing helix 22.

Rotation of the timing helix 22 can then be transferred to the camshaft 30 via the mating of the axially extending slots 22c of the timing helix 22 and the axially extending splines 30a of the camshaft 30. The transferred rotation to the camshaft 30 can be in a similar amount and direction as the timing helix 22 rotation. Similarly, rotation of the timing helix 22 may be transferred to the timing gear 23 and thus to the timing chain 31.

As the variable valve timing assembly 11 operates as above, or remains in a non-operating state, the engine can continue to rotate the camshaft 30. In turn, the rotation of the camshaft 30 can be transferred to rotation of the timing gear 23. As the timing gear 23 rotates, the timing chain 31 can move across the teeth 23a of the timing gear 23.

When the timing assembly 11 advances or retards the rotation of the camshaft 30 in a continuous (as opposed to stepped) fashion, the worm drive 15 can prevent or minimize inadvertent/unintentional reversal in the advancing or retarding of rotation.

It should be understood, of course, that the foregoing relates to exemplary embodiments of the invention and that modifications may be made without departing from the scope of the invention as set forth in the following claims.

I claim:

1. A variable valve timing assembly, comprises:
   an electric motor;
   a first set of gears driven by the electric motor;
   a first set of grooves and ball bearings driven by the first set of gears;
   a timing helix having a timing helix cylindrical body, a timing helix bottom wall from which the timing helix cylindrical body extends, and a second set of grooves;
   a timing gear having a timing gear cylindrical body and a second set of ball bearings disposed in the second set of grooves of the timing helix;
   wherein the timing helix bottom wall is configured to abut a camshaft therethrough;
   wherein the second set of grooves and ball bearings are driven by the first set of grooves and ball bearings;
   wherein the first set of grooves and ball bearings converts rotational movement of the first set of gears to axial movement of the first set of ball bearings;
   wherein the axial movement of the first set of ball bearings causes rotational movement of the second set of grooves;
   whereby the rotational movement of the second set of grooves enables rotation of the camshaft engaged to a valve.

2. The variable valve timing assembly of claim 1, wherein the first set of gears includes:
   a worm drive driven by the electric motor;

a spur gear driven by the worm drive; and
a compression gear driven by the spur gear.

3. The variable valve timing assembly of claim 1, wherein the first set of grooves and ball bearings is a ball screw.

4. The variable valve timing assembly of claim 1, further comprising:
   an anti-torsion plate intermediate the first and second sets of grooves and ball bearings.

5. The variable valve timing assembly of claim 1, further comprising:
   a thrust bearing intermediate the first and second sets of grooves and ball bearings.

6. The variable valve timing assembly of claim 1, further comprising:
   a set of teeth operatively connected to the second set of ball bearings and grooves, and configured to be driven by a timing chain.

\* \* \* \* \*